United States Patent [19]
Celentano et al.

[11] Patent Number: 6,057,912
[45] Date of Patent: May 2, 2000

[54] METHOD FOR BLACKBODY LAMP REFERENCE COMPENSATION USING A SINGLE SILICON PHOTODIODE

[75] Inventors: Mike Celentano; Greg Wiley, both of Indianapolis, Ind.

[73] Assignee: UMM Electronics, Inc., Indianapolis, Ind.

[21] Appl. No.: 09/248,483

[22] Filed: Feb. 11, 1999

Related U.S. Application Data

[60] Provisional application No. 60/074,309, Feb. 11, 1998.

[51] Int. Cl.[7] ....................................................... G01J 5/60
[52] U.S. Cl. ............................ 356/45; 356/326; 356/411; 356/319; 702/134
[58] Field of Search .................................... 356/405, 411, 356/45, 326, 319; 374/121; 396/225; 702/134

[56] References Cited

U.S. PATENT DOCUMENTS

| | | | |
|---|---|---|---|
| 4,720,190 | 1/1988 | Peterson | 356/45 |
| 4,773,761 | 9/1988 | Sugiyama et al. | 356/405 |
| 5,016,039 | 5/1991 | Sosa et al. | 354/430 |
| 5,319,437 | 6/1994 | Van Aken et al. | 356/326 |
| 5,400,138 | 3/1995 | Peterson et al. | 356/319 |
| 5,565,990 | 10/1996 | Hosoi et al. | 356/406 |
| 5,772,323 | 6/1998 | Felice | 374/127 |

*Primary Examiner*—Frank G. Font
*Assistant Examiner*—Layla Lauchman
*Attorney, Agent, or Firm*—Woodard, Emhardt, Naughton, Moriarty & McNett

[57] ABSTRACT

A method to compensate for lamp spectrum shift, comprises exposing a first detector to a first light from a lamp, thereby generating a first signal indicative of intensity of said first light; exposing a second detector to a wavelength ($\lambda$) of a second light from said lamp, thereby generating a second signal indicative of intensity of said wavelength of said second light, after said second light has interacted with a sample; determining a new color temperature ($T_1$) of said first light using the following equation $$T_1 = (F_1/A)^{1/x}$$

where $A = F_i/(T_i)^x$, x = a color temperature exponent of said lamp, $F_1$ = said first signal, $F_i$ = an initial reference signal, and $T_i$ = an initial color temperature corresponding to said initial reference signal; and determining a first compensated signal ($I_1$) using the following equation $$I_1 = S_1/B_1$$

where $$B_1 = \frac{e^{\frac{hc}{\lambda k T_i}} - 1}{e^{\frac{hc}{\lambda k T_1}} - 1}$$

S1 = said second signal, h = Planck's constant, c = speed of light in vacuum, and k = Boltzman constant.

6 Claims, 3 Drawing Sheets

```
//*******************************************************************
//Function: Ratio(oldct,oldref,newref,*ratio)
//Input: rated color temperature, old reference w\new lamp, new refread, and
//  result array pointer: array indexed 0 to 62 that is the reference ratio array
//Function Called after any reference read in main (not factory cal & lamp cal
//routine) and produces a reference array used to compensate for lamp
//temperature variations by using the black body equation and
//d(flux)=d(color temp.)^9.6 equation.
//*******************************************************************
void Ratio(int oldct, float oldref, float newref, float *ratio)
                        //oldct=rated color temp. in Kelvin
                        //oldref=avg. of 3 ref. reads with new lamp
                        //newref=avg. of 3 latest ref. reads
{
   int subscript, imin, imax;
   float newct,cbbody,wave,
   float m, b;

m=m_nm();            //gets slope & offset for nm=subscript*m+b
   b=b_nm();
   imin=0;   imax=62;
   cbbody=1.441304348E+7;     //(6.63E-34*3.00E+8)/(1E-9*1.38E-23);
                        //cbbody is a combination of black body
                        //constants used later.
   newct=_pow((newref/(oldref/_pow(oldct,9.6))),(1/9.6));
                        //newct is the new color temperature
                        //calculated from ref=C*ct^9.6 equation:
                        //newct=(newref/C)^(1/9.6) where
                        //C=oldref/oldct^9.6.
                        //_pow(x,y) is math.h function x^y
   for(subscript=imin;subscript<=imax;++subscript)
                        //Increment subscript of new array.
{
   wave=(float)subscript * m+b; //Convert subscript to wavelength
   *(ratio+subscript)=
      (_exp(cbbody/(wave*oldct))-1.0/(_exp(cbbody/(wave*newct))-1.0);
                        //Ratio of new/old blackbody radiance, with
                        //equal terms in numerator & denominator
}                       //removed. exp(x) is math.h function e^x.
                        //correctedread[wave]=uncorrectedread[wave]
                        //               ---------------
                        //                  radio[wave]
}
```

Fig. 2

METHOD FOR BLACKBODY LAMP REFERENCE COMPENSATION USING A SINGLE SILICON PHOTODIODE

This Application claims the benefit of U.S. Provisional No. 60/074,309 filed Feb. 11, 1998.

TECHNICAL FIELD OF THE INVENTION

The present invention generally relates to a method for compensating for changes in the spectrum of a lamp for use in spectrophotometery and, more particularly, to a method for blackbody lamp reference compensation using a single silicon photodiode.

BACKGROUND OF THE INVENTION

Spectrophotometers may be used to measure the color spectrum on the surface of objects, such as paper, paint chips or fabric swatches. A spectrophotometer for reflectance spectrometry usually includes a light source, such as a light bulb (or lamp) and a power source, optics for transferring the light from the light source to the sample, such as fiber optics, lenses and/or mirrors, and optics for collecting the light, which may also include fiber optics, lenses and/or mirrors. The collected light is then transferred to a device for separating the light into its component wavelengths, such as a diffraction grading or a prism, and then to a detector to measure the intensity of one or more of the different wavelengths of the light.

As a reference, the intensity of light generated by the light source may also be transferred by optics to a detector. The signal generated by the detector from the sample light, and the signal generated by the detector from the reference light, may be transferred through a data processing system, such as a computer, and the result displayed or stored. A large variety of configurations and methods are known, and are described in U.S. Pat. Nos. 5,701,175; 5,400,138; 5,319,437; 4,773,761; 3,885,878; and 3,806,256; all of which are incorporated by reference.

The typical lamp variation compensation method for the Reflectometry industry is to divide the signal of the sample by the signal of the lamp reference. In monochromatic applications, a monochromatic reference detector, such as a silicon photodiode, is adequate. In polychromatic applications, the best reference is a detector that matches the polychromatic response of the sample detector so that color shifts due to lamp temperature variations can be compensated. However, this requires great cost (e.g., two spectrophotometers instead of one). A typical compromise in lower cost systems is to use the reference reading from a monochromatic detector in each of the denominations of the polychromatic sample readings to compensate for lamp variations. It would nevertheless be desirable to have a method which could accurately compensate for variation in lamp temperature which uses only a single reference detector.

SUMMARY OF THE INVENTION

A method to compensate for lamp spectrum shift, comprises exposing a first detector to a first light from a lamp, thereby generating a first signal indicative of intensity of said first light; exposing a second detector to a wavelength ($\lambda$) of a second light from said lamp, thereby generating a second signal indicative of intensity of said wavelength of said second light, after said second light has interacted with a sample; determining a new color temperature ($T_1$) of said first light using the following equation $$T_1 = (F_1/A)^{1/x}$$

where $A = F_i/(T_i)^x$, $x$ = a color temperature exponent of said lamp, $F_1$ = said first signal, $F_i$ = an initial reference signal, and $T_i$ = an initial color temperature corresponding to said initial reference signal; and determining a first compensated signal ($I_1$) using the following equation $$I_1 = S_1/B_1$$

where $$B_1 = \frac{e^{\frac{hc}{\lambda k T_i}} - 1}{e^{\frac{hc}{\lambda k T_1}} - 1}$$

S1 = said second signal, h = Planck's constant, c = speed of light in vacuum, and k = Boltzman constant.

Accordingly, an object of the present invention is to provide a method to compensate for variations in lamp temperature using only a single reference detector.

Another object of the invention is to provide a spectrophotometer which can carry out this novel method.

Another object of the invention is to provide a computer program product to cause a spectrophotometer to compensate for variations in lamp temperature.

These objects may be achieved by a method comprising: exposing a first detector to a first light from a lamp, thereby generating a first signal indicative of intensity of said first light; exposing a second detector to a wavelength of a second light form said lamp, thereby generating a second signal indicative of intensity of said wavelength of said second light, after said second light has interacted with a sample; determining a new color temperature ($T_1$) of said first light using the following equation $$T_1 = (F_1/A)^{1/x}$$

where $A = F_i/(T_i)^x$, $x$ = color temperature exponent of said lamp, $F_1$ = said first signal, $F_i$ = an initial reference signal, and $T_1$ = an initial color temperature corresponding to said initial reference signal; and determining a first compensated signal ($I_1$) using the following equation $$I_1 = S_1/B_1$$

where $$B_1 = \frac{e^{\frac{hc}{\lambda k T_i}} - 1}{e^{\frac{hc}{\lambda k T_1}} - 1}$$

$S_1$ = said second signal, h = Planck constant, c = speed of light in vacuum, and k = Boltzman constant.

These objects may also be achieved by a computer program product, comprising: a computer storage medium and a computer program code mechanism embedded in the computer storage medium for causing a spectrometer to compensate for lamp spectrum shift, the computer program code mechanism comprising: a fist computer code device configured to receive a first signal from the spectrophotometer indicative of intensity of a first light from a lamp, said spectrophotometer comprising said lamp; a second computer code device configured to receive a second signal from the spectrophotometer indicative of intensity of a wavelength of a second light, after said second light has interacted with a sample; a third computer code device configured to calculate a new color temperature ($T_1$) using the following equation:

$$T_1 = (F_1/A)^{1/x}$$

where $A = F_i/(T_i)^x$, x=color temperature exponent of said lamp, $F_1$=said first signal, $F_i$=an initial reference signal, and $T_i$=an initial color temperature corresponding to said initial reference signal; and a fourth computer code device configured to determine a compensated signal (I1) using the following equation:

$$I_1 = S_1/B_1$$

where $$B_1 = \frac{e^{\frac{hc}{\lambda k T_i}} - 1}{e^{\frac{hc}{\lambda k T_1}} - 1}$$

$S_1$=said second signal, h=Planck constant, c=speed of light in vacuum, and k=Boltzman constant.

These objects may also be achieved by a spectrophotometer which comprises the computer program product.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a preferred embodiment C source code for controlling a computer according to the present invention.

DETAILED DESCRIPTION OF THE PREFERRED EMBODIMENTS

Figure 1:
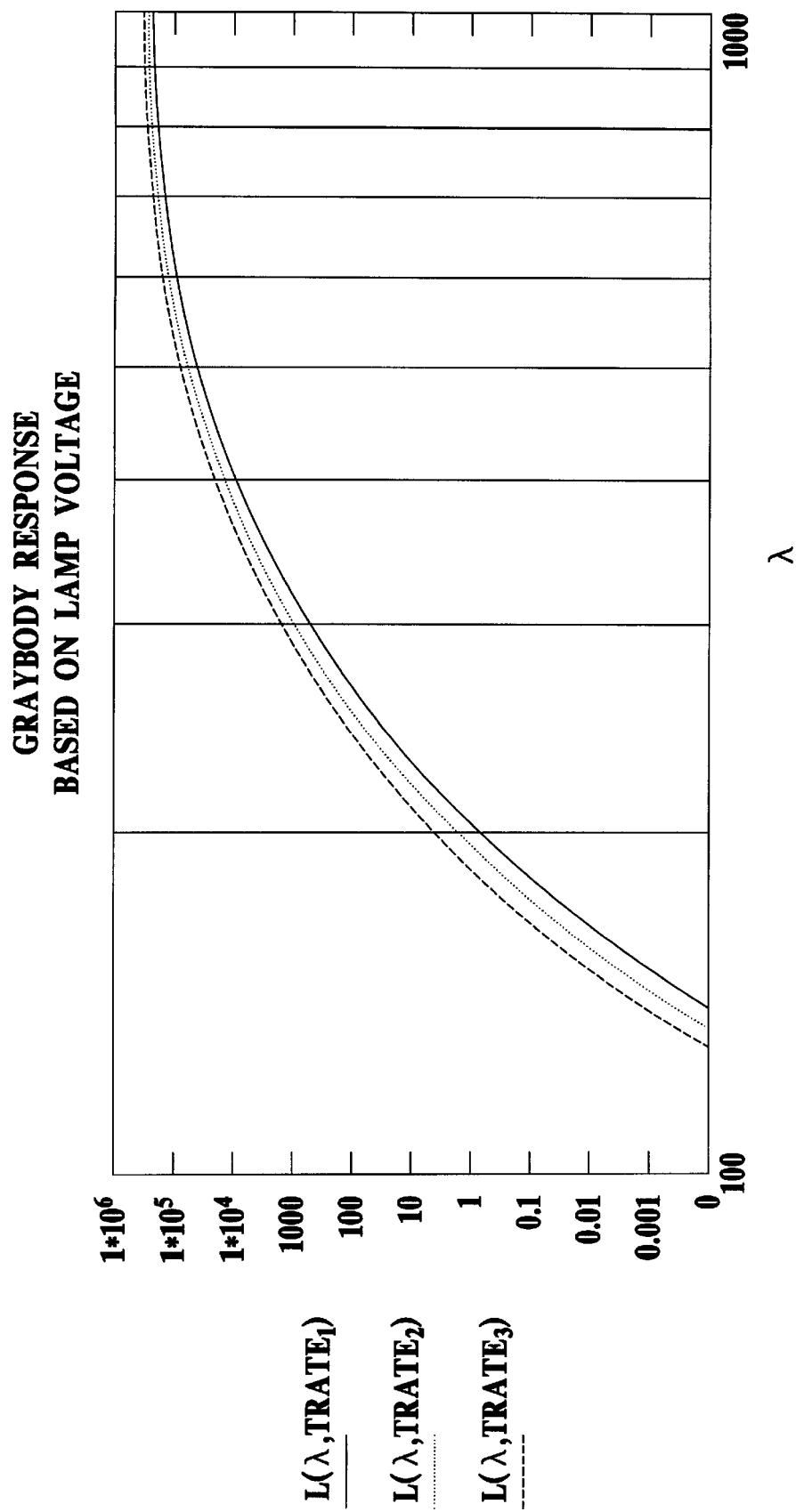
FIG. 1 is the graybody response versus wavelength of a tungsten lamp based on lamp voltage.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

A perfect radiator is called a blackbody. The intensity of radiation emitted by a blackbody is defined by Planck's Law:

$$L = \frac{2c^2 h 10^{-6}}{\lambda^5 \left( e^{\frac{hc}{\lambda k T}} - 1 \right)}$$

where

L=the intensity of radiation given off by the blackbody at a particular wavelength, c=the speed of light in vacuum, h=Planck's constant, k=Boltzman constant, T=temperature of the blackbody, $\lambda$ represents a wavelength of the light, and other symbols have their traditional meanings.

The blackbody equation can be adjusted for a graybody by multiplying Planck's Law by the emissivity, $\epsilon$, of the material which is radiating the light. Furthermore, the total intensity of light of all frequencies emitted by the blackbody, or graybody, can be found by integrating Planck's Law over all wavelengths.

Planck's Law gives the perfect theoretical result for light emitted from a perfect blackbody. By including emissivity in the equation, Planck's Law is adjusted for deviations in the "blackness" of the blackbody. However, it is important to recognize that real materials have chemical compositions, and imperfect surface structures which effect the color and intensity of light emitted by a hot body, and therefore it is difficult to predict the true spectrum of real materials with the exactitude suggested by Planck's Law.

The present inventors have made the surprising discovery that using a single reference detector to measure the intensity of light emitted by a lamp of a spectrophotometer, together with the blackbody equation, can be used to much more accurately correct for changes in light emitted by a lamp at specific wavelengths, than previous compensation methods, such as simply dividing the sample signal (at a specific wavelength of light) by the signal of the lamp reference.

Compensating for changes in the lamp brightness using Planck's Law is complex compared with the prior art method of simply dividing the sample signal by the reference signal. Furthermore, a number of assumptions must be accurate or cancel out: the lamp acts as a blackbody or graybody; the reference detector is insensitive to changes in the color of the light as the spectrum of the lamp drifts; and changes in the spectrum of the lamp are due to changes in the temperature of the lamp. The validity of these assumptions was previously unknown. In addition, the complex calculations necessary to use Planck's Law to compensate for changes in the light from the lamp requires transforming the data from the detectors back and forth, which naturally results in degradation of the signal, including roundoff errors. In spite of all of these sources for loss in accuracy, the present inventors discovered that, in fact, the resulting method for compensating for lamp variation is dramatically more accurate than simply dividing the sample signal by the signal of the lamp reference.

The method for compensating for variations in the spectral characteristics of the light source include measuring the reference signal from a reference detector; measuring a sample signal from the sample detector; determining a new color temperature using the reference signal, an initial reference signal and an initial color temperature of the lamp corresponding to the initial reference signal; and determining a compensated sample signal using the initial color temperature and the new color temperature. The initial reference signal may be determined by measuring the signal from the reference detector when the lamp is first installed in the spectrophotometer, or when it is first used in the spectrophotometer. The initial color temperature is usually reported by the manufacturer of the lamp, and is a function of voltage. For example, the GILWAY Lamp No. L513 (miniature halogen reflector lamp) from GILWAY TECHNICAL LAMP has a color temperature at the rated voltage (12 V) of 2,900 K; as a function of voltage, the color temperature is also reported: $T(V)=(2900K)((\text{new voltage})/12\text{ V}))^{1/3}$. If the rated color temperature of the lamp is not reported by the manufacturer, it may be measured by measuring the temperature of the filament of the lamp by methods well known to those of ordinary skill in the art, such as with an optical pyrometer.

The flux (or total intensity of light at all wavelengths) given off by the lamp may also be reported by the manufacturer. In the case of GILWAY Lamp No. L513 (miniature halogen reflector lamp) from GILWAY TECHNICAL LAMP, the flux is proportional to the color temperature raised to the 9.6 power. For a lamp whose relationship between flux and color temperature is not reported by the manufacturer, this relationship can be determined by measuring the intensity of each frequency of light across the spectrum of interest (for example, 380–770 nm) at a variety of different temperatures of the lamp. The temperature of the lamp may be varied by adjusting the voltage supply to the lamp. Once these spectrums are plotted on a graph, the flux over the spectrum of interest can be determined by measuring the area under the curve on a graph of the intensity of the light versus the wavelength of light. Since the flux will be proportional to the color temperature raised to some exponent x (flux=$DT^x$, where D is proportionality constant), plotting the flux versus temperature on log paper will allow determination of the exponent x. The exponent x is the color temperature exponent. It can generally be assumed that lamps of the same specific type will have the same exponent x. Furthermore, it can generally be assumed that lamps having the same filament type, such as a tungsten filament, will all follow the same proportionality relationship; for example, in the case of tungsten lamp, flux is proportional to color temperature raised to the 9.6 power, i.e., color temperature exponent x=9.6.

For purposes of the present invention, the signal of the reference detector is assumed to be proportional to the flux given off by the lamp (F=A·(flux) $AT^x$, where F=reference signal, and A is a proportionality constant). Once the value of A for a specific spectrophotometer is determined, then a change in the reference signal can be used to calculate the change in color temperature. For example, when $F_i$=initial reference signal, $F_1$=new reference signal, $T_i$=an initial color temperature corresponding to the initial reference signal, and $T_1$=new color temperature corresponding to the new reference signal, then $$T_1=(F_1/A)^{1/x} \text{ and } A=F_i/(T_i)^x.$$

In the case of a GILWAY Lamp No. L513 (miniature halogen reflector lamp) from GILWAY TECHNICAL LAMP, the color temperature exponent is x=9.6. Therefore, when a spectrophotometer is initially set up, and the initial color temperature is known (or measured) and the initial reference signal is measured, the proportionality constant A can be determined. Then for each subsequent reference signal ($F_1$, $F_2$, $F_3$, etc.) a new corresponding color temperature ($T_1$, $T_2$, $T_3$, etc.) can be determined.

Once a new color temperature is determined, then any change in intensity of a sample signal at a specific wavelength, λ, can be compensated for any drift in the spectrum of the lamp. For example, when each sample signal is measured ($S_1$, $S_2$, $S_3$, etc.) a reference signal is also measured ($F_1$, $F_2$, $F_3$, etc.). For each reference signal measured, a new corresponding color temperature ($T_1$, $T_2$, $T_3$, etc.) is also determined. For each new color temperature, a corresponding signal correction constant ($B_1$, $B_2$, $B_3$, etc.) is determined, and then a corresponding compensated sample signal ($I_1$, $I_2$, $I_3$, etc.) is determined by dividing each sample signal with its corresponding correction constant (i.e. $I_1=S_1/B_1$). The correction constant B is a ratio of the intensity of radiation emitted at the wavelength (λ) of interest by a blackbody at the new color temperature, divided by the intensity of radiation emitted by a blackbody at the wavelength (λ) of interest at the initial color temperature. Since the numerator of Planck's Law is composed of constants, and furthermore the wavelength of interest (λ) is also constant with regard to B, the ratio of L (new color temperature)/L (initial color temperature)=B, and therefore $$B_1 = \frac{e^{\frac{hc}{\lambda kT_i}} - 1}{e^{\frac{hc}{\lambda kT_1}} - 1}$$

where the compensated sample signal is $I_1=S_1/B_1$.

In calculating $B_1$, the emissivity of the tungsten filament is assumed to be constant from time 1 (when the initial reference signal $F_i$, is obtained) to time 2 (when the reference signal, $F_1$, is obtained) and is therefore canceled out of the equation. This may not be true, especially with an aging filament. Another compensation factor or ratio, E, could be empirically determined, E=$\epsilon_1/\epsilon_i$, where a new signal correction constant, B=B·E. However, it is believed that such a factor or ratio is secondary to color temperature variation.

The present invention only requires a single reference detector, such as a silicon detector from HAMAMATSU (S1226-5BQ). A reference signal generated by exposing the reference detector to light from the lamp of the spectrophotometer may be taken prior to each sample signal, thereby generating a reference signal ($F_1$, $F_2$, $F_3$, etc.) for each sample signal ($S_1$, $S_2$, $S_3$, etc.). Alternatively, although not preferred, a single reference signal may be taken for each set of multiple sample signals.

Figure 3:
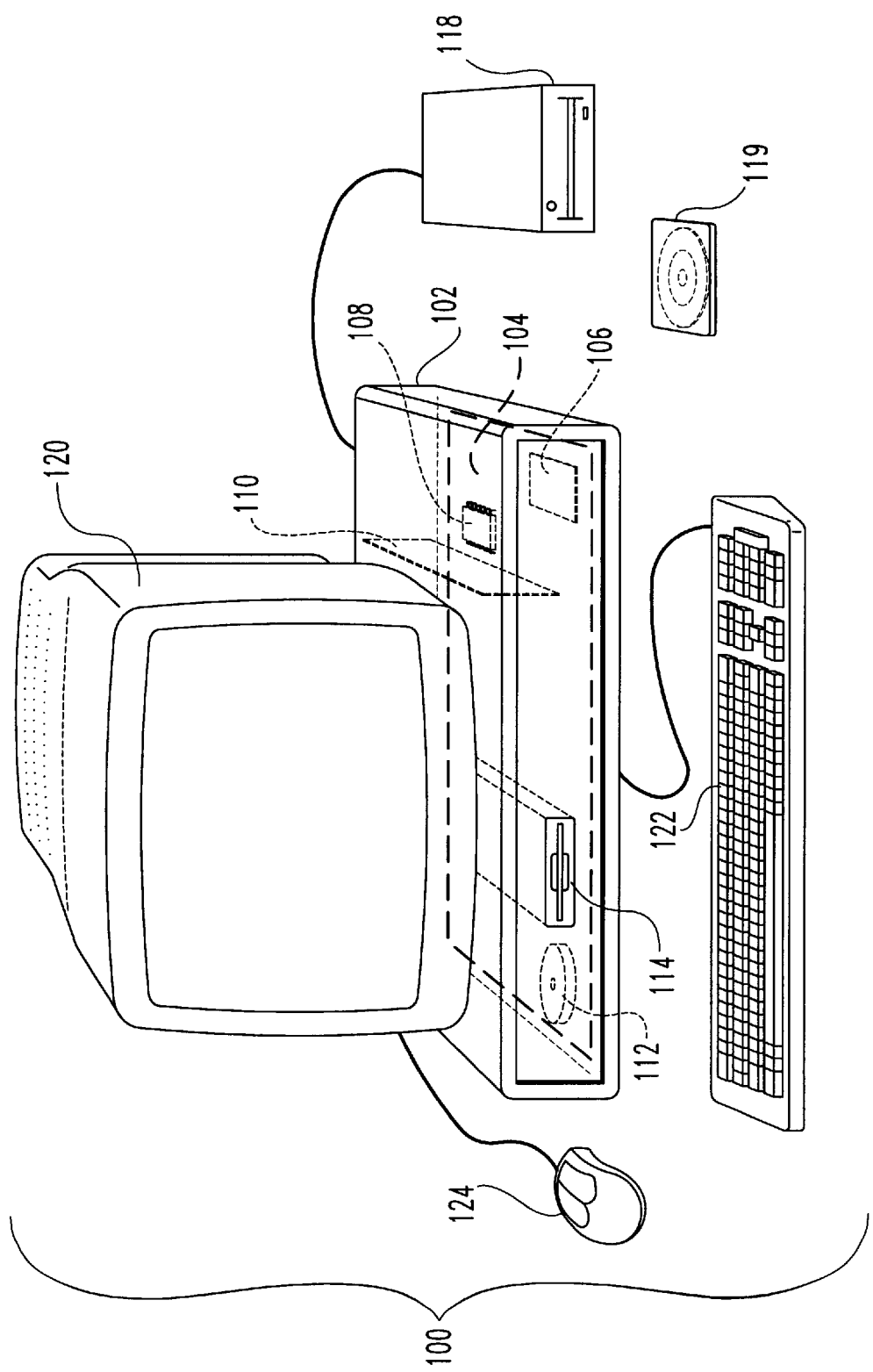
FIG. 3 is a schematic illustration of a computer system.

Once the sample signal and reference signal have been collected, the data manipulation for determining the compensated sample signal can be carried out using a computer system. FIG. 3 is a schematic illustration of a computer system. A computer 100 implements the method of the present invention, wherein the computer housing 102 houses a motherboard 104 which contains a CPU 106, memory 108 (e.g., DRAM, ROM, EPROM, EEPROM, SRAM and Flash RAM), and other optional special purpose logic devices (e.g., ASICs) or configurable logic devices (e.g., GAL and reprogramable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus or an Enhanced IDE bus). Although compact disc 119 is shown in a CD caddy, the compact disc 119 can be inserted directly into CD-ROM drives which do not require caddies. Also connected to the same device bus or another device bus as the high density media drives, the computer 100 may additionally include a compact disc reader 118, a compact disc reader/writer unit (not shown) or a compact disc jukebox (not shown). In addition, a printer (not shown) may also provide printed listings of sample signals, reference signals or compensated signals.

The system further includes at last one computer readable media. Examples of such computer readable media are compact discs 119, hard disks 112, floppy disks, tape, magnetooptical disks, PROMs (EPROM, EEPROM, Flash EPROM), DRAM, SRAM, etc.

Stored on any one or on a combination of the computer readable media, the present invention includes software for controlling both the hardware of the computer 100 and for enabling the computer 100 to interact with the human user. Such software may include, but is not limited to, device drivers, operating systems and user applications, such as development tools. Such computer readable media further includes the computer program product of the present invention for compensating spectrum shift of a lamp. An example of a source code program, written in the C language, for a computer program product of the present invention, is shown in FIG. 2.

The computer system may be directly connected to the spectrophotometer so that the signals generated by the sample and reference detector are sent directly to the computer system. Furthermore, the computer system can directly control all aspects of the spectrophotometer, as is well known to those of ordinary skill. In addition, it is also possible to integrate the computer system with the spectrophotometer into a single unit. Possibly, but less preferred, the reference and simple signals from the spectrophotometer can be input to the computer system by hand, through the keyboard.

Having generally described this invention, a further understanding can be obtained by reference to certain specific examples which are provided herein for purposes of illustration only and are not intended to be limiting unless otherwise specified.

EXPERIMENT

Reference and sample signals were measured using a spectrophotometer. In the experiment, the applied voltage was actively controlled to simulate the aforementioned color fluctuations in the light source. Knowing the applied voltage allowed determination of the color temperature as well; the color temperature is proportional to the applied voltage raised to the ⅓ power. Three different sample wavelengths, $\lambda 1=487$ nm, $\lambda 2=550$ nm and $\lambda 3=694$ nm, were used. L was determined for the rated (initial) color temperature and each specified wavelength. As the applied voltage was varied (and the color temperature as well), L was recalculated for each specified wavelength. The ratio of L (new color temperature) to L (initial color temperature) is B, a measure of the change in coloration of the light source from the rated values. Dividing the sample measurements by B gives a compensated sample signal (I) for the fluctuations in the color of the lamp.

A tungsten GILWAY Lamp No. L513 (miniature halogen reflector lamp) from GILWAY TECHNICAL LAMP was used in the spectrophotometer, and a silicon photodetector was used as the reference detector. For $\lambda 1=487$ nm, voltage to the lamp (V), the sample signal ($S\lambda 1_i$), the reference signal ($R_i$) and the color temperature (TRATE), are shown in Table 1, along with the signal correction constant (RATIO), the sample signal corrected using the present method (NEWREADING) and the sample signal corrected by the prior art method of simply dividing the sample signal with the reference signal (OLDREADING).

TABLE 1

| V | $S\lambda 1_i$ | $R_i$ | TRATE | RATIO | NEW-READING | OLD-READING |
|---|---|---|---|---|---|---|
| 10.8 | 27 | 793 | $2.8 \cdot 10^3$ | 0.694 | 38.886 | 0.034 |
| 12 | 41 | 1043 | $2.9 \cdot 10^3$ | 1 | 41 | 0.039 |
| 13.2 | 58 | 1397 | $2.994 \cdot 10^3$ | 1.376 | 42.153 | 0.042 |

FIG. 1 is a graph of intensity or radiance, L, versus the wavelength, $\lambda$.

$$OLD\%DIFF_t = \frac{(OLDREADING_i - OLDREADING_2) \cdot 100}{OLDREADING_2}$$

$$NEW\%DIFF_t = \frac{(NEWREADING_i - NEWREADING_2) \cdot 100}{NEWREADING_2}$$

$$SMP\%DIFF_i = (S\lambda l_i - S\lambda l_2)\frac{100}{S\lambda l_2}$$

Table 2 shows the percentage differences between the uncorrected sample signals ($SMP\%DIFF_i$), the sample signals correct by the inventive method ($NEW\%DIFF_i$), and the sample signals corrected by the prior art method of simply dividing by the reference signal ($ODL\%DIFFi$). 2900K is the rated color temperature of the lamp at 12 Volts. Relative color temperature change=(relative voltage change)$^{1/3}$. These readings were taken at 12 V+/−10% lamp voltage.

TABLE 2

| V | $NEW\%DIFF_i$ | $OLD\%DIFF_i$ | $SMP\%DIFF_i$ |
|---|---|---|---|
| 10.8 | −5.156 | −13.385 | −34.146 |
| 12 | 0 | 0 | 0 |
| 13.2 | 2.182 | 5.617 | 41.463 |

The percent difference in average measurements when the lamp voltage is varied from the 12 V is summarized in Table 3.

TABLE 3

| S(mV) | Sample signal divided by reference | Present invention |
|---|---|---|
| | V = 10.8 V | |
| 487 | −33.33% | −12.38% | −2.26% |
| 550 | −32.20% | −11.40% | −4.67% |
| 694 | −26.14% | −3.50% | −2.85% |
| | V = 13.2 V | |
| 487 | 41.46% | 11.17% | 1.33% |
| 550 | 35.59% | 7.34% | 0.73% |
| 694 | 29.02% | 1.9% | 1.61% |

The readings calculated from the Graybody ratio.

The variables and formulas used in the experiment are as follows:

$\lambda 1_i$=487, the wavelength [nM] of interest in the spectrometer; i: 1.3

$S\lambda 1_i$=The dark corrected readings of samples from the spectrometer at $\lambda 1$.

$R_i$=The dark corrected readings from the Si detector which are set equal to the TRATE values during the factor calibration for each instrument. Future readings are then transposed into RATIO.

Initial color temperature, TNOM=2900K; initial voltage for the initial color temperature, VNOM=12 V.

$$OLDREADING_i = \frac{S\lambda l_i}{R_i}$$

$$L(\lambda, TRATE) = \frac{2 \cdot c^2 \cdot h \cdot 10^{-6} \cdot \epsilon}{(\lambda \cdot 10^{-9})^5 \cdot \left[e^{\left(\frac{h \cdot c}{\lambda \cdot 10^{-9} \cdot k \cdot TRATE}\right)} - 1\right]}$$

$$NEWREADING_i = \frac{S\lambda l_i}{RATIO_i}$$

$$RATIO_i = \frac{L(\lambda 1, TRATE_t)}{L(\lambda 1, TRATE_i)}$$

$h = 6.63 \cdot 10^{-34}$  $c = 2.00 \cdot 10^8$  $k = 1.38 \cdot 10^{-23}$  $\epsilon = 0.33$

CONCLUSION

While simply dividing by the reference signal of the silicon detector helps to compensate the readings for fluctuations in the applied voltage (representing fluctuations in the color temperature), the improvement is not impressive. The technique of the present invention shows greater improvement. Applying this to a wavelength of 580 nm, we can use a silicon photodiode to measure the flux from the lamp. Then, as discussed above, translate that information into the color temperature of the lamp. To determine the "starting point," the instrument would have to go through calibration every time a new bulb is installed.

Obviously, numerous modifications and variations of the present invention are possible in light of the above teachings. It is therefore to be understood that within the scope of the appended claims, the invention may be practiced otherwise than as specifically described herein.

What is claimed:

1. A method to compensate for lamp spectrum shift, comprising:

exposing a first detector to a first light from a lamp, thereby generating a first signal indicative of intensity of said first light;

exposing a second detector to a wavelength ($\lambda$) of a second light from said lamp, thereby generating a second signal indicative of intensity of said wavelength of said second light, after said second light has interacted with a sample;

determining a new color temperature ($T_1$) of said first light using the following equation $$T_1 = (F_1/A)^{1/x}$$

where $A = F_i/(T_i)^x$,
   x = a color temperature exponent of said lamp,
   $F_1$ = said first signal,
   $F_i$ = an initial reference signal, and
   $T_i$ = an initial color temperature corresponding to said initial reference signal; and determining a first compensated signal ($I_1$) using the following equation $$I_1 = S_1/B_1$$

where $$B_1 = \frac{e^{\frac{hc}{\lambda kT_i}} - 1}{e^{\frac{hc}{\lambda kT_1}} - 1}$$

$S_1$ = said second signal,
   h = Planck's constant,
   c = speed of light in vacuum, and
   k = Boltzman constant.

2. The method of claim 1, wherein said lamp is a tungsten filament lamp, and said color temperature exponent x = 9.6.

3. A computer program product, comprising:

a computer storage medium and a computer program code mechanism embedded in the computer storage medium for causing a spectrometer to compensate for lamp spectrum shift, the computer program code mechanism comprising:

a first computer code device configured to receive a first signal from the spectrophotometer indicative of intensity of a first light from a lamp, said spectrophotometer comprising said lamp;

a second computer code device configured to receive a second signal from the spectrophotometer indicative of intensity of a wavelength ($\lambda$) of a second light, after said second light has interacted with a sample;

a third computer code device configured to calculate a new color temperature ($T_1$) using the following equation:

$$T_1 = (F_1/A)^{1/x}$$

where $A = F_i/(T_i)^x$,
   x = a color temperature exponent of said lamp,
   $F_1$ = said first signal,
   $F_i$ = an initial reference signal, and
   $T_i$ = an initial color temperature corresponding to said initial reference signal; and a fourth computer code device configured to determine a compensated signal ($I_1$) using the following equation:

$$I_1 = S_1/B_1$$

where $$B_1 = \frac{e^{\frac{hc}{\lambda kT_i}} - 1}{e^{\frac{hc}{\lambda kT_1}} - 1}$$

$S_1$ = said second signal,
   h = Planck's constant,
   c = speed of light in vacuum, and
   k = Boltzman constant.

4. The computer program product of claim 3, wherein said lamp is a tungsten filament lamp, and said color temperature exponent x = 9.6.

5. A spectrophotometer, comprising:

a lamp, a computer system, and the computer program product of claim 3.

6. The spectrophotometer of claim 5, wherein said lamp is a tungsten filament lamp, and said color temperature exponent x = 9.6.

* * * * *